Figure 1:

Jan. 8, 1963 YUZO MIURA ET AL 3,071,818
METHOD OF MANUFACTURING ANTISTATIC MOULDINGS
Filed Nov. 12, 1958 2 Sheets-Sheet 1

Yuzo Miura,
Tomomichi Tsukada,
Shizuo Hayashi,
INVENTORS by Wendroth, Lind &
Ponack
Attorneys

United States Patent Office 3,071,818
Patented Jan. 8, 1963

3,071,818
METHOD OF MANUFACTURING
ANTISTATIC MOULDINGS
Yuzo Miura, Tokyo, Tomomichi Tsukada, Kawasaki-shi, and Shizuo Hayashi, Tsurumi-ku, Yokohama, Japan, assignors to Tokyo Shibaura Electric Co., Ltd., Kawasaki-shi, Japan, a corporation of Japan
Filed Nov. 12, 1958, Ser. No. 773,213
Claims priority, application Japan Apr. 26, 1958
3 Claims. (Cl. 18—59)

This invention relates to a method of manufacturing antistatic moldings or more particularly to a method of manufacturing plastic moldings in which an antistatic agent is present only in the outer plastic layer part so that a semipermanent antistatic effect may be provided.

Plastic moldings are usually such good electric insulators that electrostatic charges produced on the surfaces by handling are accumulated and, as a result, adsorb dust in the air. It is very difficult to remove such dust. Such difficulties are experienced with phonograph records, electric fan blades, lighting fixtures and the like and are detrimental to both appearance and use. Further, when the amount of electrostatic charge is sufficiently large, electric shock or fire may be caused thereby and care must be taken in the handling.

It has been conventional to coat the surface of a molding with a proper surface active agent as an antistatic agent, for example, painting the surface thinly with the surface active agent by spraying or by wiping the surface with thin paper or cloth impregnated with a dilute solution of said surface active agent. However, with such coating method, no long continuing antistatic effect is obtained, and it is necessary to re-treat the surface of the molding from time to time. We have suggested a method of manufacturing antistatic plastic moldings wherein a composite powder is prepared by coating or mixing a plastic powder with an antistatic agent without hot-rolling and then hot-pressing the composite powder particles. This method can make the semi-permanent antistatic effect last without the need for any re-treatment, but requires the use of a comparatively large amount of antistatic agent.

An object of the present invention is to manufacture a plastic molding having an antistatic effect without painting the surface of the plastic molding with a solution of an antistatic agent.

Another object of the present invention is to manufacture plastic moldings having a semi-permanent antistatic effect without operating the re-treatment.

A further object of the present invention is to manufacture plastic moldings provided with a semi-permanent antistatic effect by using a comparatively small amount of an antistatic agent.

The present invention relates to a method of manufacturing antistatic moldings wherein a plastic powder material which is to be a core material for a plastic molding and contains no antistatic agent is heated and hot-pressed as coated with a plastic powder material containing an antistatic agent. There are various embodiments of the present invention. They shall now be explained with reference to the drawings as follows:

The drawings show the combination of a core material and a coating material and the process of molding an article from these materials.

FIGURE 1 is a side view showing a core tablet containing no antistatic agent, and coating tablets containing the antistatic agent are spaced from both front and back surfaces of said core tablet.

Figure 2:
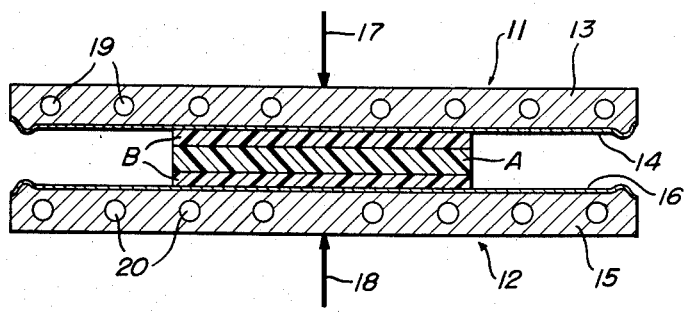
Figure 3:
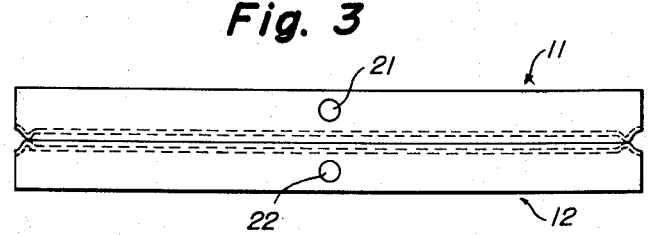
Figure 4:
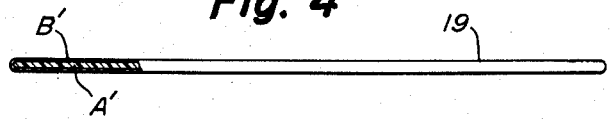
Figure 5:
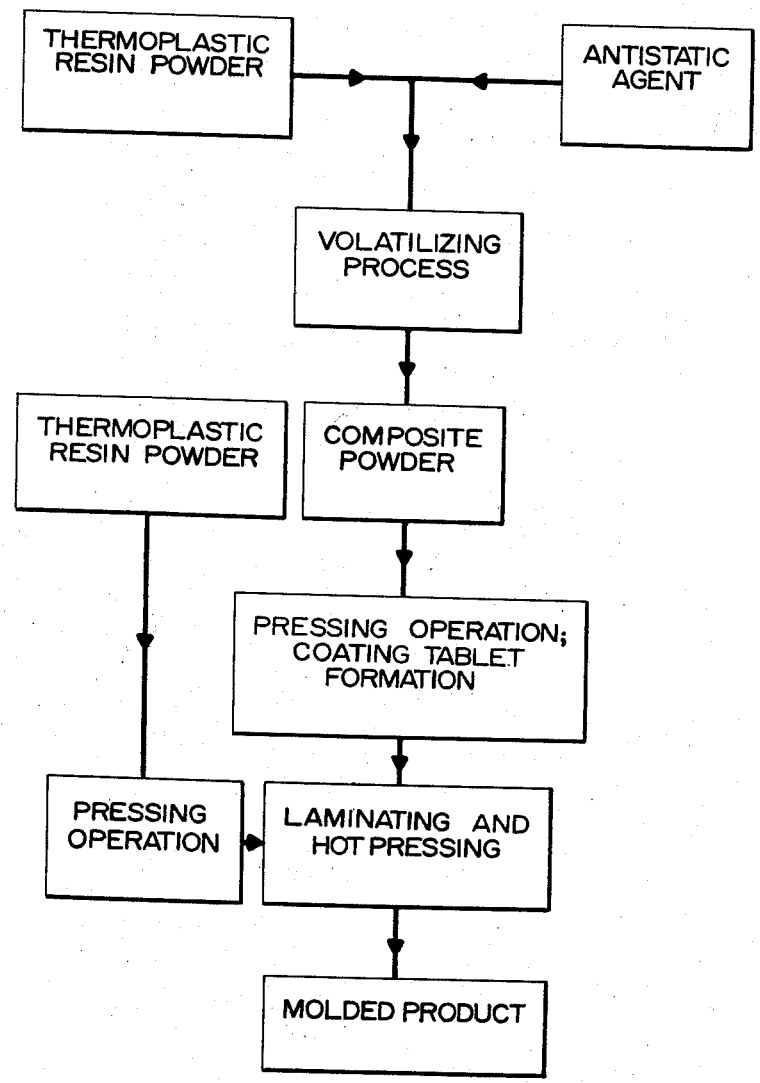

FIG. 2 is a longitudinal section showing diagrammatically a laminate structure consisting of one core tablet and two coating tablets, as shown in FIG. 1, inserted between molds. FIG. 3 is a side view of FIG. 2 showing the mold when the laminate structure has been hot-pressed. FIG. 4 is a cross sectional view showing a finished plastic molding. FIG. 5 is a flow diagram presentation of the inventive process.

FIGURE 1 shows a combination of a core tablet A formed of a plastic powder containing no antistatic agent and two surface coating tablets B formed of a plastic powder containing an antistatic agent. The laminate structure of said core plastic tablet A with said coating plastic tablets B put on both sides thereof is inserted between molds 11 and 12 as shown in FIG. 2. All the above mentioned tablets will form compressed solids of a plastic powder.

FIG. 2 molds 11 and 12 show an example of conventional molds for manufacturing record disks wherein stampers 14 and 16 are fixed to the interior of base tablets 13 and 15 made of metal. The laminated structure is hot-pressed when the molds 11 and 12 are heated and pressed in the direction of arrows 17 and 18. Spiral holes 19 and 20 perforated in the molds 11 and 12 provided for introducing mediums for heating and cooling, respectively. In FIG. 3, respective openings 21 and 22 of the molds 11 and 12 are inlets for introducing the above-mentioned mediums, and outlets are provided, for instance, on the opposite side.

After the molds 11 and 12 shown in FIG. 3 have been cooled, such molding as shown in FIG. 4 is taken out. The laminate structure extends in radial direction perpendicular to the pressing direction, whereby a coating tablet material B' coats the entire surface of a core tablet material A'.

Among the antistatic agents applicable to the present invention are cation active agents, anion active agents, nonionic active agents and ampholytic active agents which shall now be shown as follows:

(A) CATION ACTIVE AGENTS (i) Quaternary ammonium salt type:
   (a) Stearamidopropyldimethyl-$\beta$-hydroxyethyl ammonium nitrate (produced by American Cyanamid Company).
   (b) Catiogen L (produced by First Industrial Pharmaceutical Company, Ltd. (Daiichi Kogyo Seiyaku Kabushiki Kaisha)).
   (c) Kotamin-18 (alkyltrimethyl ammonium chloride) (produced by Kao Soap Company, Ltd. (Kao Sekken Kabushiki Kaisha)).

(ii) Alkylpyridinium salt type:
   (a) Catiogen H (alkylpyridinium chloride) (produced by First Industrial Pharmaceutical Company, Ltd. (Daiichi Kogyo Seiyaku Kabushiki Kaisha)).

(B) ANION ACTIVE AGENTS (i) Aliphatic alcohol phosphate type:
   (a) Zelec NE (produced by Du Pont Company).

(b) Elenon No. 19 (Alkyl phosphate) (produced by First Industrial Pharmaceutical Company, Ltd. (Daiichi Kogyo Seiyaku Kabushiki Kaisha)).

(c) Elenon No. 1003 (produced by First Industrial Pharmaceutical Company, Ltd. (Daiichi Kogyo Seiyaku Kabushiki Kaisha)).

(C) NONIONIC ACTIVE AGENTS (i) Polyoxyethyleneglycolalkylester type:
   (a) Elenon No. 9 (produced by First Industrial Pharmaceutical Company, Ltd. (Daiichi Kogyo Seiyaku Kabushiki Kaisha)).

(ii) Polyoxyethyleneglycolether type:
   (a) Elenon No. 10 (produced by First Industrial Pharmaceutical Company, Ltd. (Daiichi Kogyo Seiyaku Kabushiki Kaisha)).

(iii) Sorbitan fatty acid ester type:
   (a) Sorgen 90 (sorbitan mono-laurate) (produced by First Industrial Pharmaceutical Company, Ltd. (Daiichi Kogyo Seiyaku Kabushiki Kaisha)).

(D) AMPHOLYTIC ACTIVE AGENTS (i) Imidazoline type:
   (a) Amogen No. 3 (producer by First Industrial Pharmaceutical Company, Ltd. (Daiichi Kogyo Seiyaku Kabushiki Kaisha)).
   (b) Lipomin LH (produced by Lion Oil and Fatty Company, Ltd. (Lion Yushi Kabushiki Kaisha)).

(ii) Betaine type:
   (a) Amogen K (produced by First Industrial Pharmaceutical Company, Ltd. (Daiichi Kogyo Seiyaku Kabushiki Kaisha)).
   (b) Anon BT (produced by Japan Oil and Fat Company, Ltd. (Nippon Yushi Kabushiki Kaisha)).

The amount of the antistatic agent in proportion to the resin composition in the surface coating material is proper in the range of 0.5 to 10% by weight. Below 0.5%, the antistatic effect will not be sufficient. Above 10% the antistatic effect will not only unnecessarily increase, but the performance of the resin will fall. Thus, either case is not good. The amount of the surface coating material in proportion to the core material is proper at 2 to 10% by weight. Below 2%, the antistatic effect is nonuniform. Above 10% the durability of the antistatic effect not only unnecessarily increases, but the antistatic agent cannot be saved (comparatively) as a result.

In the present invention, the antistatic effect of the molding was judged by the surface resistance of the molding and the electrostatic potential at a fixed distance. The surface resistance was determined by measuring the resistance value when the distance between a pair of electrodes in contact with the surface of the mold was 1 cm. The electrostatic potential was measured at a distance of 2 cm. above the surface of the molding by means of a commercial electrostatic potential measuring apparatus (the electrostatic field meter used is made for depending on the principle shown in the article mentioned on page 48 of The British Journal of Applied Physics, Supplement No. 2, 1953.) If the 1 cm. surface resistance of the above mentioned molding at a relative humidity of 50% and at a surrounding temperature of 25° C. is less than about $10^{10}\Omega$, electrostatic charges will hardly occur. In general the surface insulation resistances of moldings made of such resin materials as vinyl chloride-vinyl acetate copolymer resins and polyvinyl chloride are all above $10^{10}\Omega$. For example, in the case of a molding made of a vinyl chloride-vinyl acetate copolymer resin, when the relative humidity was 60% and the temperature was 25° C., the electrostatic potential was shown to be −1500 v. in the normal state and to be −5000 v. after rubbing 3 times with a cotton cloth buff; and the adsorption of dust, paper fiber, cotton fiber and the like was remarkable. On the other hand, when the electrostatic potential of a molding manufactured by applying the present invention was measured under the same conditions, it was shown to be only 5 to 50 v. in the normal state and 15 to 80 v. after rubbing 3 times with a cotton cloth buff.

*Example*

An ethyl alcohol solution containing 0.5% by weight of antistatic agent stearamidopropyldimethyl-β-hydroxyethyl ammonium nitrate was sprayed onto a 100% vinyl chloride-vinyl acetate copolymer resin powder having 12 to 15% vinyl acetate and an average polymerization degree of 400 to 500 and coated the surface of the powder while said powder was being stirred. The ethyl alcohol was then volatilized to prepare a surface coating composite powder. Said composite powder was inserted between molds and was pressed under a pressure of 100 to 150 kg./cm.$^2$ at the normal temperature (or under 50 kg./cm.$^2$ if heated to 60° C.) to form tablets about 80 mm. in diameter and about 2 mm. thick corresponding to B in FIGURE 1. On the other hand, a vinyl chloride-vinyl acetate copolymer powder containing no antistatic agent was inserted between molds to form a tablet 80 mm. in diameter and 20 mm. thick corresponding to A in FIGURE 1. After combined structure of the tablet A with two tablets B put on both sides thereof was preheated to 110 to 120° C. it was inserted between stampers, and then molded under a surface pressure of about 100 kg./cm.$^2$ at 150° C. into a record disk 10 inches in diameter as shown in FIGS. 2, 3 and 4. The surface resistance at 1 cm. between electrodes contacted to this molded disk was below $10^9\Omega$ at a relative humidity of 50% and a room temperature. Its electrostatic potential at a distance of 2 cm. apart at a relative humidity of 60% and a temperature of 25° C. measured by means of an electrostatic potential measuring apparatus was +25 v. in the normal state and +30 v. after rubbing 3 times with a cotton cloth buff.

What we claim is:

1. A method for manufacturing antistatic plastic moldings comprising the steps of
   (a) mixing a thermoplastic resin powder selected from the group consisting of vinyl chloride and vinyl chloride copolymer with a solution containing 0.2–2% by weight antistatic agent,
   (b) volatilizing the resultant solution to form a composite powder,
   (c) pressing said composite powder to form coating tablets,
   (d) pressing the thermoplastic resin powder to form a core tablet,
   (e) interposing one core tablet between two coating tablets whereby a laminate structure is obtained, and
   (f) hot-pressing the resultant laminate structure to form a molding, the diameter of said molding, in a direction perpendicular to the pressing direction, being substantially larger than the corresponding diameters of said core tablet or said coating tablets, whereby said coating tablet covers the core tablet and is incorporated to a substantial depth therein over the entire surface area of said molding.

2. A method for manufacturing antistatic plastic moldings comprising the steps of
   (a) mixing a vinyl chloride-vinyl acetate copolymer resin powder of an average polymerization degree of 400 to 500 with ethanol containing 0.5% by weight stearamidopropyldimethyl - β - hydroxyethyl ammonium nitrate,
   (b) volatilizing the ethanol to form a composite powder,
   (c) pressing said composite powder to form coating tablets,
   (d) pressing vinyl chloride-vinyl acetate copolymer resin powder to form a core tablet,
   (e) interposing one core tablet between two coating tablets whereby a laminate structure is obtained, and (f) hot-pressing the resultant laminate structure to form a molding, the diameter of said molding, in a direction perpendicular to the pressing direction, being substantially larger than the corresponding diameters of said core tablet or said coating tablets, whereby said coating tablet covers the core tablet and is incorporated to a substantial depth therein over the entire surface area of said molding.

3. A method according to claim 1 wherein hot pressing under step f is continued until the diameter of the resulting molding, in a direction perpendicular to the pressing direction, is from about 2 to 3 times larger than the diameter of said core tablet.

References Cited in the file of this patent

UNITED STATES PATENTS

| | | |
|---|---|---|
| 1,322,631 | Segal | Nov. 25, 1919 |
| 1,522,948 | Emerson | Jan. 13, 1925 |
| 1,863,799 | Loetscher | June 21, 1932 |
| 1,988,928 | Trobridge | Jan. 22, 1935 |
| 2,176,604 | Buekelman | Oct. 17, 1939 |
| 2,276,035 | Guhl | Mar. 10, 1942 |
| 2,282,328 | Herrick | May 12, 1942 |
| 2,294,796 | Moulder | Sept. 1, 1942 |
| 2,318,589 | Barnette | May 11, 1943 |
| 2,341,360 | Bulgin | Feb. 8, 1944 |
| 2,444,394 | Arnold | June 29, 1948 |
| 2,571,193 | Broderson | Oct. 16, 1951 |
| 2,624,725 | Bjorksten | Jan. 6, 1953 |
| 2,640,817 | Sheridan | June 2, 1953 |
| 2,673,369 | Galeski | Mar. 30, 1954 |
| 2,678,285 | Browning | May 11, 1954 |
| 2,693,006 | Shigekawa | Nov. 2, 1954 |
| 2,982,683 | Boyce | May 2, 1961 |
| 2,994,111 | Koss | Aug. 1, 1961 |

FOREIGN PATENTS

| | | |
|---|---|---|
| 151,511 | Australia | May 20, 1953 |
| 564,007 | Canada | Sept. 30, 1958 |